United States Patent [19]
Bullock, IV et al.

[11] Patent Number: 5,486,280
[45] Date of Patent: Jan. 23, 1996

[54] PROCESS FOR APPLYING CONTROL VARIABLES HAVING FRACTAL STRUCTURES

[75] Inventors: Jonathan S. Bullock, IV, Oak Ridge; Roger L. Lawson, Oliver Springs, both of Tenn.

[73] Assignee: Martin Marietta Energy Systems, Inc., Oak Ridge, Tenn.

[21] Appl. No.: 326,425

[22] Filed: Oct. 20, 1994

[51] Int. Cl.$^6$ .................................................... C25D 1/00
[52] U.S. Cl. ........................... 205/67; 205/102; 205/103; 205/104; 204/DIG. 9
[58] Field of Search .............................. 205/87, 102, 103, 205/104; 204/DIG. 9, 228

[56] References Cited

U.S. PATENT DOCUMENTS

| | | | |
|---|---|---|---|
| 3,929,593 | 12/1975 | Sugiyama et al. | 204/35 N |
| 3,969,195 | 7/1976 | Dötzer et al. | 204/14 N |
| 3,975,254 | 8/1976 | Elco et al. | 204/228 |
| 4,140,596 | 2/1979 | Wöbking . | |
| 4,414,077 | 11/1983 | Yoshida et al. | 204/35 N |
| 4,436,591 | 3/1984 | de Hek | 204/11 |
| 4,517,059 | 5/1985 | Loch | 204/14.1 |
| 4,545,875 | 10/1985 | Riley | 204/129.4 |
| 4,666,567 | 5/1987 | Loch | 204/14.1 |
| 4,704,196 | 11/1987 | Saito et al. | 204/130 |
| 5,007,016 | 4/1991 | Le Méhauté et al. | 364/900 |
| 5,202,018 | 4/1993 | Horányi et al. | 204/129.2 |
| 5,242,556 | 9/1993 | Masuzawa | 204/129.43 |
| 5,355,318 | 11/1994 | Dionnet | 364/468 |

OTHER PUBLICATIONS

"Theory and Practice of Pulse Plating", Ed. by J. C. Puippe and F. Leaman, American Electroplaters and Surface Finishers Society, Orlando (1986).

"Chaos", J. Gleick, Penguin Books, New York (1987).

"Exploring the Geometry of Nature", E. Rietman, Windcrest Books, Blue Ridge Summit, Pa. (1989).

"Fractal Creations", T. Wegner and M. Peterson, Waite Group Press, Mill Valley, Calif. (1991).

"The Arrow of Time", P. Coveney and R. Highfield, Ballantine Books, New York (1990).

"Geometrical Forms known as fractals find sense in chaos", Smithsonian, Dec. 1983, pp. 110–117.

"Fractal Analysis of Zine Electrodeposition", J. Electrochem. Soc. V. 137, No. 7, Jul. 1990, pp. 2047–2051.

"Researchers Find Order, Beauty in Chaotic Chemical Systems", C&EN, Jan. 21, 1991, pp. 18–29.

"Fractals Offer Mathematical Tool for Study of complex Chemical Systems", C&EN, Apr. 22, 1991, pp. 28–35.

"Beating a Fractal Drum", Science, Dec. 13, 1991, p. 1593.

*Primary Examiner*—John Niebling
*Assistant Examiner*—Brendan Mee
*Attorney, Agent, or Firm*—E. A. Pennington; V. A. Branton; H. W. Adams

[57] ABSTRACT

A process and apparatus for the application of a control variable having a fractal structure to a body or process. The process of the present invention comprises the steps of generating a control variable having a fractal structure and applying the control variable to a body or process reacting in accordance with the control variable. The process is applicable to electroforming where first, second and successive pulsed-currents are applied to cause the deposition of material onto a substrate, such that the first pulsed-current, the second pulsed-current, and successive pulsed currents form a fractal pulsed-current waveform.

17 Claims, 2 Drawing Sheets

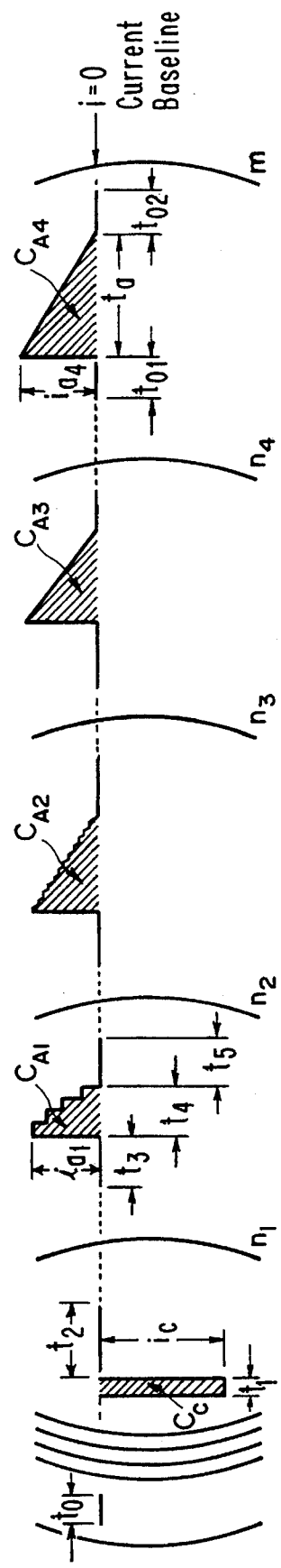

PROCESS FOR APPLYING CONTROL VARIABLES HAVING FRACTAL STRUCTURES

This invention was made with Government support under contract DE-AC05-840R21400 awarded by the U.S. Department of Energy to Martin Marietta Energy Systems, Inc. and the Government has certain rights in this invention.

FIELD OF THE INVENTION

The present invention is directed to a process and apparatus for applying a control variable having self-similar, i.e., fractal, structures to a body or process. More particularly, the present invention is directed to a pulsed-current electroforming method and apparatus that relies upon a waveform design which is fractal.

A fractal, or self-similar, structure has structural characteristics on a small scale similar to those it has on a large scale. A control variable having a fractal structure incorporates multiple scales into a single control variable. The addition of multiple scales permits the control variable to be optimized by merely varying a limited number of fractal parameters.

BACKGROUND OF THE INVENTION

Pulsed-current has been used alone, and in combination with periodic-reverse current, to influence the microstructure and morphology of electrolytically plated bodies.

The time scales historically used for cathodic current pulses have been on the order of microseconds to deciseconds, although for commercial applications time scales of milliseconds have been more common. Where periodic-reverse current is applied, the time scale for the anodic pulses is similar to, or somewhat greater than, the time scale for the cathodic pulses.

There are also specific "off" times of zero current or reduced current associated with the "on" times. This gives rise to duty cycle values for the anodic and cathodic pulse waveform repeating units. Thus the variables of: cathodic pulse time, amplitude and duty cycle; anodic pulse time, amplitude and duty cycle; pulse shape; ratio of anodic to cathodic coulombs per repeating unit; and net mean current and current density all have a significant bearing on the operation and performance of the overall pulsed plating process.

For a specific set of other conditions, including material being plated, specific plating electrolyte, temperature, flow condition, etc., the electrical waveform variables must be optimized to optimize the process. Further, specific pulse time scales may affect specific dimension scales on the deposited surface, such that microscale roughness may be controlled but macroscale roughness is not controlled. Similarly, pulse time scales may also affect specific dimension scales on the deposited surface, such that macroscale roughness is controlled but microscale roughness is not controlled.

As a result of the foregoing considerations, the optimization of a pulsed-plating process is very complex, limiting its usefulness to platers in the general commercial world.

Examples of such electrolytic processes are disclosed in the following patents: U.S. Pat. Nos. 3,929,593 to Sugiyama et al., 3,969,195 to Dötzu, 3,975,254 to Felco et al., 4,140,596 to Wöbking, 4,414,077 to Yoshida et al., 4,436,591 to de Hek, 4,517,059 to Loch et al., 4,545,875 to Riley, 4,666,567 to Loch, 4,704,196 to Saito et al., 5,202,018 to Harányl et al., 5,242,556 to Masuzawa.

Although the concept of self-similar, i.e, fractal, topography has been studied and utilized, to date all uses of fractal concepts relate to analysis of signals and information processes, understanding of naturally occurring fractal structures and mathematical objects, and production of images for decorative purposes. Examples of the use of fractal topography are disclosed in the following publications: "Chaos", J. Gleick, Penguin Books (1987); "Exploring the Geometry of Nature", E. Rietman, Windcrest Books, Blue Ridge Summit, Pennsylvania (1989); "The Arrow of Time", P. Coveney and R.

Highfield, Ballantine Books, New York (1990); "Geometrical forms known as fractals find sense in chaos" *Smithsonian*, December 1983, pp. 110–117; "Fractal Analysis of Zinc Electrodeposition", *J. Electrochem Soc.*, V. 137, No. 7, July 1990, pp. 2047–51; "Researchers Find Order, Beauty in Chaotic Chemical Systems", *C&EN*, Jan. 21, 1991, pp. 18–29; "Fractals offer Mathematical Tool for Study of Complex Chemical Systems", *C&EN*, Apr. 22, 1991, pp. 28–35; and "Beating a Fractal Drum" *Science Dec.* 13, 1991, p. 1593.

In view of the prior art, a need currently exists for a control variable having a fractal structure that can be utilized to optimize and improve a procedure or product. Additionally, a need exists for an electroforming process and apparatus providing great control over the deposition of an electrolytic material upon a substrate. The present invention provides such a process and apparatus.

SUMMARY OF THE INVENTION

Therefore, an object of the present invention is the provision of a process and apparatus utilizing a control variable having a fractal structure to optimize and improve a method or product.

A further object of the present invention is the provision of a process and apparatus for applying a control variable having a fractal structure to a body to optimize the effect of the control variable.

Another object of the present invention is the provision of a process and apparatus permitting the application and control of control variable over a large range of scales.

It is also an object of the present invention to provide an electroforming process and apparatus providing great control over the deposition of electrolytic material upon a substrate.

A further object of the present invention is the provision of an electroforming process and apparatus utilizing a fractal waveform to control the deposition of materials.

Another object of the present invention is the application of self-similar, i.e., fractal, topography to the design of pulsed-plating waveforms.

It is also an object of the present invention to provide an electroforming process and apparatus permitting the use of complex plating waveforms with time scales for the cathodic and anodic current pulses that vary from the microsecond range to the decisecond range.

These and other objects are achieved by the present invention which is directed to a process and apparatus for the application of a control variable having a fractal structure to a body or process. The process of the present invention comprises the steps of generating a control variable having a fractal structure and applying the control variable to a body or process reacting in accordance with the control variable. The process is applicable to electroforming where first and second pulsed-current waveforms are applied to cause the deposition of material onto a substrate, such that the first pulsed-current waveform and the second pulsed-current waveform form a fractal pulsed-current waveform. Successive pulsed current waveforms may also be added to the fractal pulsed-current waveform if they are deemed necessary for the particular application.

Other objects, advantages and salient features of the present invention will become apparent from the following detailed description, which taken in conjunction with the annexed drawings discloses the preferred embodiments of the present invention.

BRIEF DESCRIPTION OF THE DRAWINGS

FIG. 3 is representative of a fractal waveform.

DETAILED DESCRIPTION OF THE INVENTION

The present invention is a process and apparatus for applying a self-similar, i.e., fractal, control variable to a body or process, to optimize the effect of the control variable. A fractal, or self-similar, control variable has the same structural characteristics on small scales as it does on its largest scale. A control variable having a fractal structure incorporates multiple scales into a single control variable. The use of multiple scales permits the control variable to be optimized by merely varying a limited number of fractal parameters.

Although the present invention could be used in conjunction with many applications where control variables are utilized, we have specifically found a control variable having a fractal structure to be well suited for use with pulsed-current electroforming. As such, the present invention will be described as it is applied in the field of pulsed-current electroforming. The use of fractal waveforms in conjunction with pulsed-current electroforming should be considered to be exemplary of the present invention, and should not be considered to limit the scope of the present invention.

Figure 1:
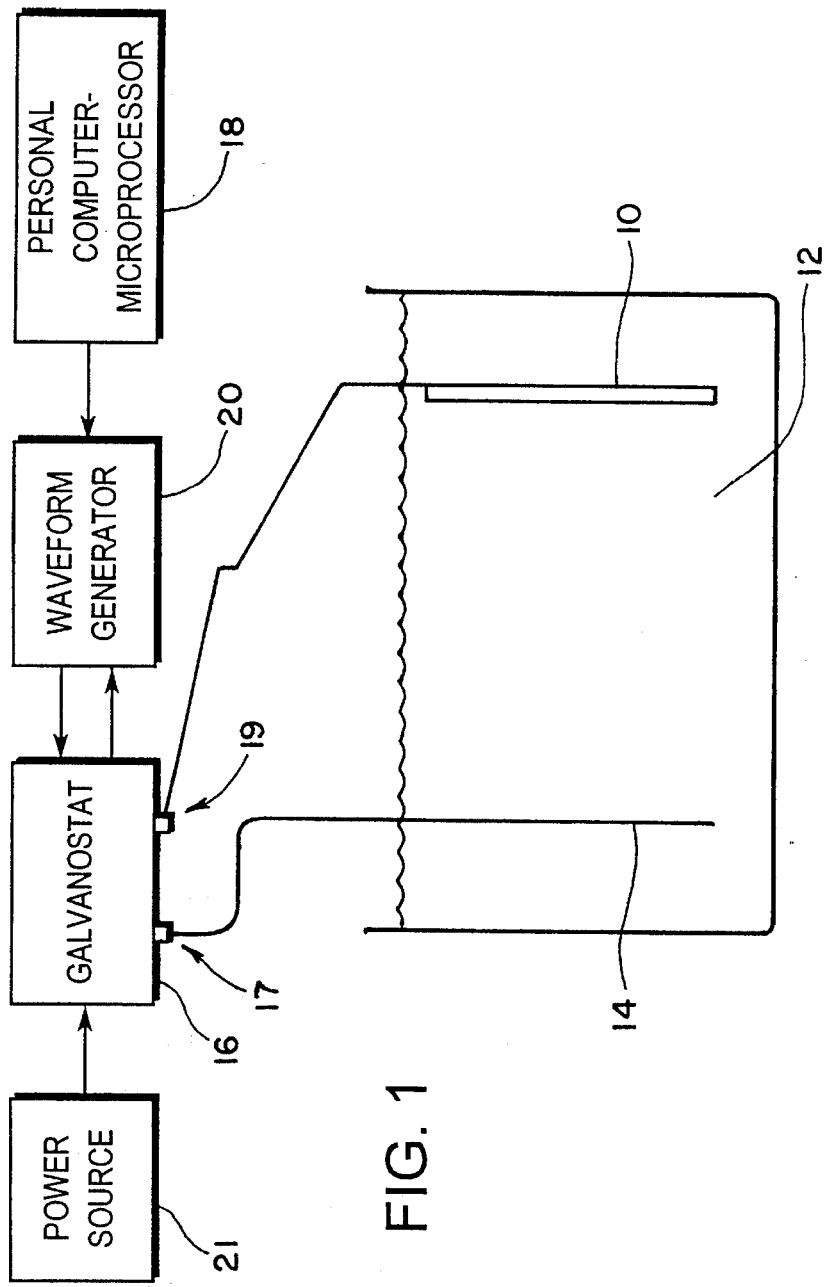
FIG. 1 is a schematic of the apparatus.

With reference to FIG. 1, electroforming is achieved by placing a substrate 10 within an electrolytic solution 12. Current is passed between the substrate 10 and the electrode 14 to cause the deposition of components of the electrolyte on the substrate 10. The electrode 14 is connected to the galvanostat 16 by a counter electrode connection 17, while the substrate 10 is connected to the galvanostat 16 by a working electrode connection 19. The waveform of the current applied by the galvanostat 16 is controlled by a waveform generator 20 which is in turn controlled by a microprocessor 18, loaded with appropriate software. The power required by the galvanostat is obtained from the power source 21, which for example can be 120 VAC mains.

Specifically, in accordance with the present invention pulsed-current electroforming is achieved with periodic reverse current, using a waveform design which is fractal with respect to the distribution in time of cathodic and anodic coulombs. Thus, the waveform incorporates current pulses of durations covering several time scales to control roughness (a.k.a. morphological instability) on several size scales.

The fractal waveform is designed and, on command, is impressed as an input signal on a power amplifier, such as a galvanostat, such that a plating process can be driven by the power amplifier in a manner described herein. This is achieved by generating the design of the fractal waveform using a software program running on a personal computer, with output of the waveform to an arbitrary waveform generator, or by using a program located on a PROM chip which is housed in a waveform generator dedicated to electroforming in accordance with the present invention. In either case, the self-similar design of the waveform permits complete specification of a complex waveform with a relatively small number of parameters, each one being not arbitrary, but related to real physical properties of the plating system, especially mass-transfer characteristics.

As stated above, a power amplifier acting as a galvanostat is necessary for applying controlled-current pulses. However, it is also possible to operate in a controlled-voltage mode using a potentiostat. The same piece of hardware can be used in some cases in either a galvanostatic or a potentiostatic mode.

In accordance with the present invention, a lead-plating bath incorporating lignosulfonate and coumarin additives to a lead fluoborate solution has been used to illustrate the diversity of morphologies that may be obtained by changing fractal parameters in accordance with the present invention. It should be noted that this study did not achieve, nor was it intended to achieve, the development of an ideal pulsed plating process for lead from this particular solution. It was intended to demonstrate a wide variety of micro and macro morphologies which could be obtained by varying parameters within the fractal waveform paradigm, and in this regard was successful.

The various conditions used in the demonstration typically had certain characteristics in common: a mean net current density of generally 35–42 ma per square cm; a ratio of total anodic coulombs to total cathodic coulombs of 0.56–0.70 to 1, but more typically 0.58–0.61 to 1; anodic pulses of rectangular, triangular or trapezoidal shape; and plating to a thickness of 0.03 to 0.09 cm, but more typically 0.07 to 0.09 cm. By varying the manner in which the anodic current was distributed through the waveform, i.e, making the waveform self-similar on 2, 3 or 4 levels, the morphology of the lead deposit was significantly altered. The cathodic pulse width was held constant at 1 millisecond for most of the test cases. Limited testing varying the cathodic pulse width, using the durations of 50 microseconds and correspondingly shortened anodic pulses, revealed this to be a further useful parameter of control. Varying this parameter also permits the use of more levels of self-similarity.

Generally, a fractal waveform used for pulsed-current electroforming could include a first series of cathodic pulses followed by an anodic pulse. The anodic pulse is intended to remove a predefined portion of the material deposited as a result of the cathodic pulses. This is the first level cathodic/anodic pulsed current combination unit and would be repeated a predetermined number of times.

A second level fractal waveform would then consist of a predetermined number of repeating units of the first level cathodic/anodic pulsed-current combination followed by a second anodic pulse. The second anodic pulse is also intended to remove a predefined portion of the deposited material. In the case of the second anodic pulse, it removes a predetermined portion of the material deposited as a result of the first level cathodic/anodic pulsed-current combination. The second level then becomes the repeating unit.

Figure 2:
FIG. 2 is a sequence representing a three level fractal waveform.

Depending upon the details of the electroforming being conducted, the levels can be extended until the desired results are achieved. For example, FIG. 2 shows three levels where the cathodic pulses are repeated three times and each pulsed-current combination is repeated twice. In FIG. 2, C represents a cathodic pulse, $A_1$ represents the first level anodic pulse, $A_2$ represents the second level anodic pulse, $A_3$ represents the third level anodic pulse.

More specifically, an example of a fractal waveform with rectangular cathodic pulses and triangular anodic pulses is shown in FIG. 3. More specifically, an example of a fractal waveform with rectangular cathodic pulses and triangular anodic pulses is shown in FIG. 3 First, the elements of the figure will be defined, followed by a description of the operation of the example. The horizontal axis of the figure is the time axis, and all subscripted "t"s are time intervals. This example is equivalent in general to actual waveforms used in experimentation by the inventors; it thus reflects characteristics which are specific to the hardware actually used in these experiments. The must significant such characteristic is the discretization of time, that is, that time comes in chunks no smaller than some fixed value for any particular set of circumstances chosen. The smallest of these (the time unit) for this example is $t_0$. Subscripted "C"s are quantities of electrons passed, i.e., coulombs. Subscript "c"s refer to cathodic, i.e., plating current. Subscript "a"s refer to anodic, i.e., deplating/stripping/anodizing current. Subscripted "n"s refer to the number of times that the waveform segment is repeated. The "m" refers to the number of times to repeat the entire waveform; it is selected to achieve the desired plating thickness.

The specific legend items are defined as follows: $t_0$ is equal to the smallest "clock" (time) interval and is included in the starting position at zero current to cope with an artifact of waveform generator operation; $t_1$ is the length of the rectangular cathodic pulse, typically equal to $t_0$ and for most of the experiments performed was equal to 1 millisecond; $t_2$ is the time at zero current following the cathodic pulse, and is typically 4–9 times $t_1$; $t_1$ and $t_2$ taken together constitute the "cathodic pulse," which is repeated $n_1$ times; $i_c$ is the amplitude of the cathodic pulse measured in unites of current; $i_a$ is the maximum amplitude of the anodic pulse in current units, is constrained to certain current density values, and as a first approximation will be the same at all scales; $C_c$ is the number of coulombs per cathodic pulse and for a rectangular pulse is equal to the product of $i_c$ times $t_1$; and $C_{A1}$ is the number of coulombs per anodic pulse associated with the shortest repeating period, while $C_{A2}$, $C_{A3}$, etc. are associated with successively longer periods. After a train of n cathodic pulses, each of level i and length t, which accumulate n*i*t coulombs, an anodic pulse carrying f*n*i*t coulombs is passed. The anodic pulse removes the fraction f of the deposited material (or performs some other functions such as removing sorbed hydrogen or other materials). The value of f may, for example, be 0.2000. After this cathodic and anodic combination is passed for n times, a total of n*(1–f)*n*i*t net cathodic coulombs are passed.

At this point, a second anodic pulse carrying f*n*(1–f)*n*i*t coulombs is passed and this cathodic/anodic combination then becomes the second level repeating unit. Additional levels, that is, additional anodic pulses, could be added depending upon the characteristics of electroforming being conducted. Thus, if the anodic coulombs per level is 0.2000 of the total net coulombs passed to that point: for one level the net cathodic coulombs becomes 0.8000 of the total; for two levels the net becomes 0.6400 of the total; for three levels the net becomes 0.5120 of the total; for four levels the net becomes 0.4096 of the total; and so forth. Conversely, if it is desired to control the proportion of net to total coulombs at 0.4096, then; for four levels each level requires 0.2000; for three levels each level requires 0.2573; for two levels each level requires 0.3600; for five levels each level requires 0.1635; and so forth.

Thus, a very complex plating waveform with time scales for the cathodic and anodic current pulses varying from the microsecond range to the decisecond range can be specified by defining a few fractal parameters. The inclusion of multiple time scales for current pulses permits influence over surface roughnesses at multiple size scales. Variation of these parameters has permitted control over dependence on initial roughness as well as dependence on electrolyte flow properties.

The electroforming process described above as the preferred embodiment uses multiple pulse durations within one waveform, allowing control of surface irregularities of multiple characteristic sizes. Further, the highly complex waveform, especially tailored to take advantage of mass transfer properties at the electrode interface, can be generated with an algorithm using recursive principles such that only a few parameters need be defined to generate an entire waveform incorporating thousands of elements. Further, the programming of a function generator using a self-similar algorithm may itself be a unique concept.

Although the present invention has been described above with a variable time scale for the pulses, the waveform could be varied in a variety of ways while remaining within the scope of the present invention. For example, the amplitude or shape of the pulse could be varied while producing a fractal waveform useful to optimize an electroforming process.

Specifically, the anodic pulse amplitude, shape and duration could be a function of the level in the fractal structure, as could that of the cathodic pulse.

The use of this invention has unique advantages in applying aggressive experimental designs for sorting out the exact best current pulse time scale and amplitude needed for given plating systems. Also, the use of fractal waveforms, and by extension fractal boundary conditions at the electrode, may exert a damping effect on the generation of flow-induced standing-wave patterns which lead to undesired deposition patterns.

As discussed above, the invention as applied to electroforming can be embodied in either a software program or a firmware (i.e., PROM chip) program, and the degree of integration of the hardware and software can be varied to suit specific needs.

The fractal design concept embodied by the present invention can also be applied to cathodic-only or anodic-only (e.g., anodization) processes, as well as controlled-potential pulsed processes. The rich frequency content of the fractal waveform might be useful as a probe to perform in-process diagnostics of the plating or other processes in a manner similar to the use of multiple-frequency signals to perform FFT-based impedance measurements.

When longer time scales of the fractal design permit, mass transfer can be altered in synchronization with the waveform. For example, the rotation of a body or the flow of fluid through a jet, etc. can be interrupted or modified while the longest anodic pulse is being applied. This may in some cases permit true electropolishing conditions to be attained or approached. Self-similarity may be maintained as a simple function, or the proportion of currents may vary with the level, such that the longest time scale may have proportionately more or less current than the shortest, with intermediate levels proportioned thereto.

Fractal programming of other process control variables may be useful. The general concept of controlling a process by using a control variable with fractal structure is, as far as we are aware, unique. For example, stereolithography creates 3-dimensional objects using the action of a laser beam to polymerize, flash melt/freeze, or otherwise transform a material such that it takes on a solid shape mimicking the path of the laser beam. It is known that complex images can be created from a small number of input parameters by using fractal-based algorithms. Such algorithms can then be used in stereolithography to create solid objects, with minimum input of variables. Such a process could yield, for example, high-strength yet very light bodies with density smoothly changing from very low (highly porous) to high enough to provide a dense, strong means of connection to said body.

Similarly, a laser beam could be driven using fractal algorithms to trace a pattern on a surface, thereby directly inscribing said pattern or enhancing electrodeposition or anodic material removal, or other fabrication method, in said pattern so as to create surface structures having unique light absorption, diffraction or filtration properties, electrical current collection or unique structures for fluid diffusion (some of the lead electroforms produced using fractal waveforms have interesting porosity structure, which might have gas diffusion or catalyst manufacture implications). Driving an ultrasonic cleaner with a fractally-structured waveform may yield a more uniform distribution of sound energy through the volume of the cleaner. It may also be possible to create light patterns and/or sound patterns of unusual beauty and appeal by programming audio synthesizers or laser light show sources using fractal algorithms.

While the preferred embodiment of the present invention has been shown and described, it will be understood that it is not intended to limit the disclosure, but rather it is intended to cover all modifications and alternative methods and apparatuses as falling within the sphere and scope of the invention as defined in the appended claims or their equivalents.

What is claimed is:

1. A process for applying a fractal pulsed-current waveform across a substrate and an electrode located in an electrolyte to cause the deposition of a material on the substrate, comprising the steps of:

applying a first pulsed-current waveform to cause the deposition of the material onto the substrate;

applying a second pulsed-current waveform to cause the deposition of the material onto the substrate;

the first pulsed-current waveform and the second pulsed-current waveform forming a fractal pulsed-current waveform.

2. The process according to claim 1, wherein the first pulsed-current waveform comprises a series of cathodic pulses followed by a first anodic pulsed-current.

3. The process according to claim 2, wherein the second pulsed-current waveform comprises the first pulsed-current waveform repeated a predetermined number of times followed by a second anodic pulsed-current distinct from the first anodic pulsed-current.

4. The process according to claim 3, wherein the second anodic pulsed-current has a longer duration than the first anodic pulsed-current.

5. The process according to claim 2, wherein the first pulsed-current waveform is repeated a predetermined number of times.

6. The process according to claim 5, wherein the second pulsed-current waveform comprises the first pulsed-current waveform repeated a predetermined number of times followed by a second anodic pulsed-current.

7. The process according to claim 6, wherein the second anodic pulsed-current has a longer duration than the first anodic pulsed-current.

8. The process according to claim 1, wherein the second pulsed-current waveform comprises the first pulsed-current waveform repeated a predetermined number of times followed by a secondary pulsed-current waveform distinct from the first pulsed-current waveform.

9. The process according to claim 1, further comprising the step of applying successive pulsed-current waveforms to cause the deposition of the material onto the substrate.

10. A process for electroforming, comprising the steps of:

applying a pulsed-current waveform across a substrate and an electrode located in an electrolyte to cause the deposition of a material on a surface of the substrate;

the pulsed-current waveform having a fractal waveform selected to achieve a desired characteristic of the material deposited on the surface of the substrate, wherein the fractal waveform comprises a first pulsed-current waveform and a second pulsed-current waveform.

11. The process according to claim 5, wherein the first pulsed-current waveform comprises a series of cathodic pulses followed by a first anodic pulsed-current.

12. The process according to claim 11, wherein the second pulsed-current waveform comprises the first pulsed-current waveform repeated a predetermined number of times followed by a second anodic pulsed-current distinct from the first anodic pulsed current.

13. The process according to claim 12, wherein the second anodic pulsed-current has a longer duration than the first anodic pulsed-current.

14. The process according to claim 11, wherein the first pulsed-current waveform is repeated a predetermined number of times.

15. The process according to claim 14, wherein the second pulsed-current waveform comprises the first pulsed-current waveform repeated a predetermined number of times followed by a second anodic pulsed-current.

16. The process according to claim 15, wherein the second anodic pulsed-current has a longer duration than the first anodic pulsed-current.

17. The process according to claim 10, wherein the second pulsed-current waveform comprises the first pulsed-current waveform repeated a predetermined number of times followed by a secondary pulsed-current waveform distinct from the first pulsed-current waveform.

* * * * *